United States Patent [19]

Fertl et al.

[11] Patent Number: 4,484,470

[45] Date of Patent: Nov. 27, 1984

[54] METHOD AND APPARATUS FOR DETERMINING CHARACTERISTICS OF CLAY-BEARING FORMATIONS

[75] Inventors: Walter H. Fertl; Naum Ruhovets, both of Houston, Tex.

[73] Assignee: Dresser Industries, Inc., Dallas, Tex.

[21] Appl. No.: 455,772

[22] Filed: Jan. 5, 1983

Related U.S. Application Data

[63] Continuation-in-part of Ser. No. 416,826, Sep. 13, 1982.

[51] Int. Cl.³ .............................................. E21B 49/00
[52] U.S. Cl. ..................................................... 73/152
[58] Field of Search ................... 73/152; 250/253, 256, 250/262; 364/422

[56] References Cited

U.S. PATENT DOCUMENTS

| | | | |
|---|---|---|---|
| 3,638,484 | 2/1972 | Tixier | 73/152 |
| 4,096,385 | 6/1978 | Marett | 250/262 |
| 4,233,839 | 11/1980 | Coates | 73/152 |
| 4,263,509 | 4/1981 | Fertl et al. | 250/255 |
| 4,271,356 | 6/1981 | Groeschel et al. | 250/262 |

OTHER PUBLICATIONS

"Evaluation of Shaly Clastic Reservoir Rocks", by Fertl and Frost, Society of Petroleum Engineers, 9/1980, Entirety.

*Primary Examiner*—Jerry W. Myracle
*Attorney, Agent, or Firm*—Patrick H. McCollum; Richard M. Byron

[57] ABSTRACT

The volume of clay within earth formations is determined throughout the vertical extent of a borehole using measurements of the natural gamma rays emitted from these formations comprised substantially entirely of clay. The clay volume determination is used for evaluating the volume of potassium oxide present in the formations. The percent of expandable layers present within the formations is determined, as a direct indicator of potential clay swelling difficulties and thus sensitivity to formation damage sensitivity, based on an extrapolated and normalized potassium oxide volume. The percent expandable layers determination is used for determining the cation exchange capacity of the formations.

20 Claims, 4 Drawing Figures

METHOD AND APPARATUS FOR DETERMINING CHARACTERISTICS OF CLAY-BEARING FORMATIONS

RELATED CASES

This is a continuation-in-part of copending U.S. patent application Ser. No. 416,826, which was filed Sept. 13, 1982.

BACKGROUND OF THE INVENTION

This invention relates generally to methods and apparatus for evaluating subsurface formations and more specifically relates to methods and apparatus for determining characteristics of clay-bearing geological formations by raidoactivity well logging.

In the oil and gas exploration industry, subsurface formations are investigated to determine if hydrocarbon resources may be found therein. When a subsurface reservoir containing hydrocarbon-bearing formations is discovered, it is important to analyze the reservoir formations and to evaluate the practical and economic feasibility of producing the hydrocarbon resources therefrom. Many factors may be considered in analyzing the producibility of the formations within a reservoir; of particular interest are characteristics such as the reservoir porosity, representing the pore volume of the reservoir formations, the fluid saturation characteristics of the reservoir, representing the fraction of the formation pore volume filled with specific types of fluids, and the reservoir permeability, or the ease with which the fluids flow through the formations. Such reservoir characteristics may be determined through analysis of data relating to various subsurface parameters, such data obtained through use of well logs and/or "core" samples recovered from the subsurface formations. Because reservoir characteristics may change throughout the vertical extent of a reservoir due to the geological composition of the formations contained therein, well log data offers an advantage over core data in that well log data may typically be obtained generally continuously throughout the vertical extent of the reservoir in a manner which is time consuming and difficult to duplicate through reliance upon core samples.

Certain reservoirs, specifically those reservoirs containing shale-bearing formations, may be difficult to fully evaluate using conventional well log analysis techniques. In shaly reservoirs, accurate log evaluation depends on a correct determination of water saturation and clay characteristics. Key parameters include clay volume, cation exchange capacity and the sensitivity of the clays to reservoir stimulation and production. Shales typically contain a predominance of clay minerals of differing types intermixed with a variety of non-clay minerals such as quartz, feldspar, mica, and carbonates. Some clay materials found in subsurface formations are illite, kaolinite, chlorite and montmorillonite. Because these non-clay minerals are essentially inseparably intermixed with the clay minerals and because it is the type of clay minerals within the shales which, directly or indirectly, most significantly affect reservoir properties, the term "clay" is used herein essentially synonymously with "shale", thus including these non-clay minerals, and the "clays" are described in terms of the different clay minerals contained therein, the producibility characteristics of clay-bearing formations are significantly affected by the volumes of clay contained therein. Further, different types of clays and their modes of distribution within the reservoir formations affect reservoir properties differently, even with a consistent volume of clay present. Additionally, the type and volume of clay and the type of distribution thereof may change continually throughout the reservoir formations, thereby causing significant variations in various parameters related thereto. For example, the volume of "bound water" within a formation, that volume of formation water which is electrochemically bound to the clay minerals within the formation, is functionally related to both the porosity and the permeability of the formation and varies significantly in response to the type and volume of clay and the mode of distribution thereof within the formation.

Clay corrections typically assume that the clay deposited during the various phases of a continuous sedimentation cycle has the same composition through the complete cycle. By assuming that the clay materials are all equivalent, clay corrections can more easily be calculated and applied. However, results have been found to be unrealistic under some formation conditions resulting in an appraisal which has been too pessimistic in some zones and which may condemn some zones of commercial significance. Such corrections do not take into account the fact that influence of clay volume of formations measurements is nonlinear due to different cation exchange capacities of various clay minerals. Cation exchange is the reaction whereby hydrated, positively charged ions of a solid, such as clay, are exchanged, equivalent for equivalent, for cations of like charge in solution.

In the evaluation of the producibility of a reservoir it is not uncommon to rely upon models based upon various geological parameters, including bound water and porosity data, to describe certain reservoir characteristics, such as fluid saturation and permeability. The accuracy of the characteristics described by the models is clearly dependent upon the accuracy of the data contained therein. Therefore, because of the above-described effects of clay type, volume, and distribution upon reservoir parameters, it is important to continuously evaluate such clay parameters throughout the reservoir.

Another means known to the prior art of estimating various reservoir parameters has been to utilize a correlation, such as a graphic crossplot, of two well logs, such as a bulk density log and an acoustic travel time log, or a bulk density log and a neutron log, to establish a graph upon which is indicated a line representing reservoir formations essentially free of shale or clay, or a 0% clay volume, and a single point, determined from the two logs, representing a 100% shale or clay volume within the reservoir, the coordinates of such point being the response values of each log in such 100% clay environment. Other responses of the logs are then scaled between these two limits to estimate the clay volume at other horizons within the reservoir. Because of the differing responses of the logging instruments to differing clay types and distributions within the reservoir formations, such a method may lead to significant errors in the volume of clay determined at any given depth horizon within the formations. Further, the coordinates or log response values representing 100% clay are also taken as constants, at least within a given portion of the reservoir, and additional reservoir parameters are determined in response thereto. By establishing these log response values as constants, such a method again fails to account for the aforementioned clay types and distributions within the formations and the differing responses of the logging instruments thereto, and is therefore prone to yield further erroneous data regarding those formations.

One means known in the prior art of estimating formation parameters is described in U.S. Pat. No. 4,263,509. This method utilizes a high-resolution, gamma ray spectrometer incorporated in a well logging instrument to derive measurements of characteristic formation radiations which can be correlated to formation data derived from core samples taken from the well. The functional relation between the radiation measurements and the core data can be utilized in evaluating radioactivity data derived from other formations in the same geologic region. Due to the reliance upon core data as used by this technique it has proven difficult and time consuming to derive a functional relationship for use through the vertical extent of a well.

Accordingly, the present invention provides methods and apparatus for in situ determination of formation characteristics without the use of cores or additional formation measurements. Such formation characteristics include a generally continuous volume of clay determination, the cation exchange capacity of the formations and an indicator of the sensitivity of the reservoir to damage from stimulation and production.

SUMMARY OF THE INVENTION

A well logging instrument, including a high-resolution gamma ray spectrometer, traverses a borehole, whereby natural radiation strikes a scintillation crystal contained therein. The impinging gamma rays cause the crystal to emit photons in the visible energy region, the intensities of which are proportional to the energy lost in the crystal by the incident gamma rays. Light energy from the crystal is optimally coupled to a photomultiplier tube where the energy is converted to electrical pulses which are amplified and transmitted to the surface. The pulses have amplitudes linearly related to the energy of the incident gamma rays.

Upon reaching the surface the pulses pass through a multi-channel analyzer circuit where they are sorted for each depth point according to amplitude and coupled into channels which remove information relating to the three radioactive isotopes, potassium-40, uranium and thorium, according to their peak energies. Selected signals or total gamma ray counts are used to determine the volume of clay contained within the formations, the percent of expandable layers present and the cation exchange capacity of the formations.

DETAILED DESCRIPTION OF THE PREFERRED EMBODIMENT

Figure 1:
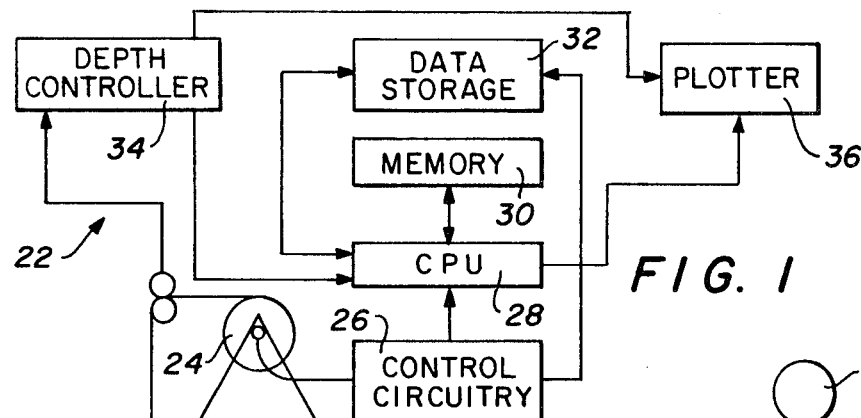
FIG. 1 illustrates a suite of logging instruments disposed within a borehole penetrating an earth formation, illustrated in vertical section, and coupled to equipment at the earth's surface in accordance with the method and apparatus of the present invention.

Referring now to the drawings in more detail, particularly to FIG. 1, therein is illustrated a suite of logging instruments 10, disposed within a borehole 11 penetrating an earth formation 13, illustrated in vertical section, and coupled to equipment at the earth's surface in accordance with the method and apparatus for determining characteristics of clay-bearing formations of the present invention. Logging instrument suite 10 can include a resistivity device 12, a natural gamma ray device 14, and two porosity-determining devices, such as a neutron device 16 and a density device 18. Resistivity device 12 may be one of a number of different types of instruments known to the art for measuring the electrical resistivity of formations surrounding a borehole so long as such device has a relatively deep depth of investigation. For example, a device such as that described in U.S. Pat. No. 3,772,589 issued Nov. 13, 1973 to Scholberg or as that described in U.S. Pat. No. 3,329,889 issued July 4, 1967 to Tanguy is appropriate for usage with the present invention. Natural gamma ray device 14 includes a high-resolution gamma spectrometer comprised of a large cylindrical sodium-iodide, thallium activated crystal which is optically coupled to a photomultiplier tube such that when the crystal is impinged by gamma rays a succession of electrical pulses is generated by the photomultiplier tube. The electrical pulses so produced have a magnitude proportioned to the energy of the impinging gamma rays. As is well known in the art, many long-life radioactive nuclides occur in nature. These electrical pulses represent the energy of these naturally occurring nuclides which may include potassium, uranium and thorium. Neutron device 16 may be one of several types known to the art for using the response characteristics of the formation to neutron radiation to determine formation porosity, for example, a device such as that described in U.S. Pat. No. 3,483,376 issued Dec. 9, 1969 to S. Locke et al. Such a device is essentially responsive to the concentration of hydrogen atoms within the formation. Density device 18 is preferably a conventional gamma-gamma density instrument such as that described in U.S. Pat. No. 3,321,625 issued May 23, 1967 to J. S. Wahl, used to determine the bulk density of the formation.

Instrument suite 10 is supported within borehole 11 by a cable 20 containing electrical conductors (not illustrated) for communicating electrical signals between instrument suite 10 and the surface electronics, indicated generally at 22, located at the earth's surface. Logging devices 12, 14, 16 and 18 within instrument suite 10 are cooperatively coupled such that electrical signals may be communicated between each device 12, 14, 16 and 18 and surface electronics 22. Cable 20 is attached to a drum 24 at the earth's surface in a manner familiar to the art. Instrument suite 10 is caused to traverse borehole 11 by spooling cable 20 on to or off of drum 24, also in a manner familiar to the art.

Surface electronics 22 includes such electronic circuitry as is necessary to operate devices 12, 14, 16 and 18 within instrument suite 10 and to process the data therefrom. Control circuitry 26 contains such power supplies as are required for operation of the chosen embodiments of logging devices within instrument suite 10 and further contains such electronic circuitry as is necessary to process and normalize the signals from such devices 12, 14, 16 and 18 in a conventional manner to yield generally continuous records, or logs, of data pertaining to the formations surrounding borehole 11. These logs are then preferably processed in accordance with the methods such as those to be described later herein or may be electronically stored in data storage 32 for later processing. Control circuitry 26 preferably further contains electronic circuitry, such as that described in U.S. Pat. No. 4,271,356 issued June 2, 1981 to Groeschel et al, which is herein incorporated by reference, for separating radiation measurements from natural gamma ray device 14 into individual energy bands centered about energy peaks of selected elemental sources of radiation, preferably the energy peaks of potassium, uranium and thorium.

Surface electronics 22 may also include such equipment as will facilitate machine implementation of the method of the present invention. Central processing unit (CPU) 28 may be of various forms but preferably is an appropriate digital computer programmed to process data from logging devices 12, 14, 16 and 18 in accordance with a method such as will be described later herein. Memory unit 30 and data storage unit 32 are each of a type to cooperatively interface with CPU 28 and/or control circuitry 26. Depth controller 34 determines the longitudinal movement of instrument suite 10 within borehole 11 and communicates a signal representative of such movement to CPU 28 and plotter 36. Plotter 36 may be of a variety of forms suitable for receiving signals from CPU 28 and depth controller 34 and recording them as a function of depth.

Although logging devices 12, 14, 16 and 18 are illustrated as component parts of instrument suite 10 to be traversed through borehole 11 simultaneously, it is to be understood that logging devices 12, 14, 16 and 18 may be traversed through borehole 11 individually or in subcombinations and the signals therefrom stored in data storage 32 until such time as all necessary data is obtained. It is to be appreciated that processing of such data in accordance with the present invention will preferably occur at the wellsite or may be at a remote time and/or location.

Figure 2:
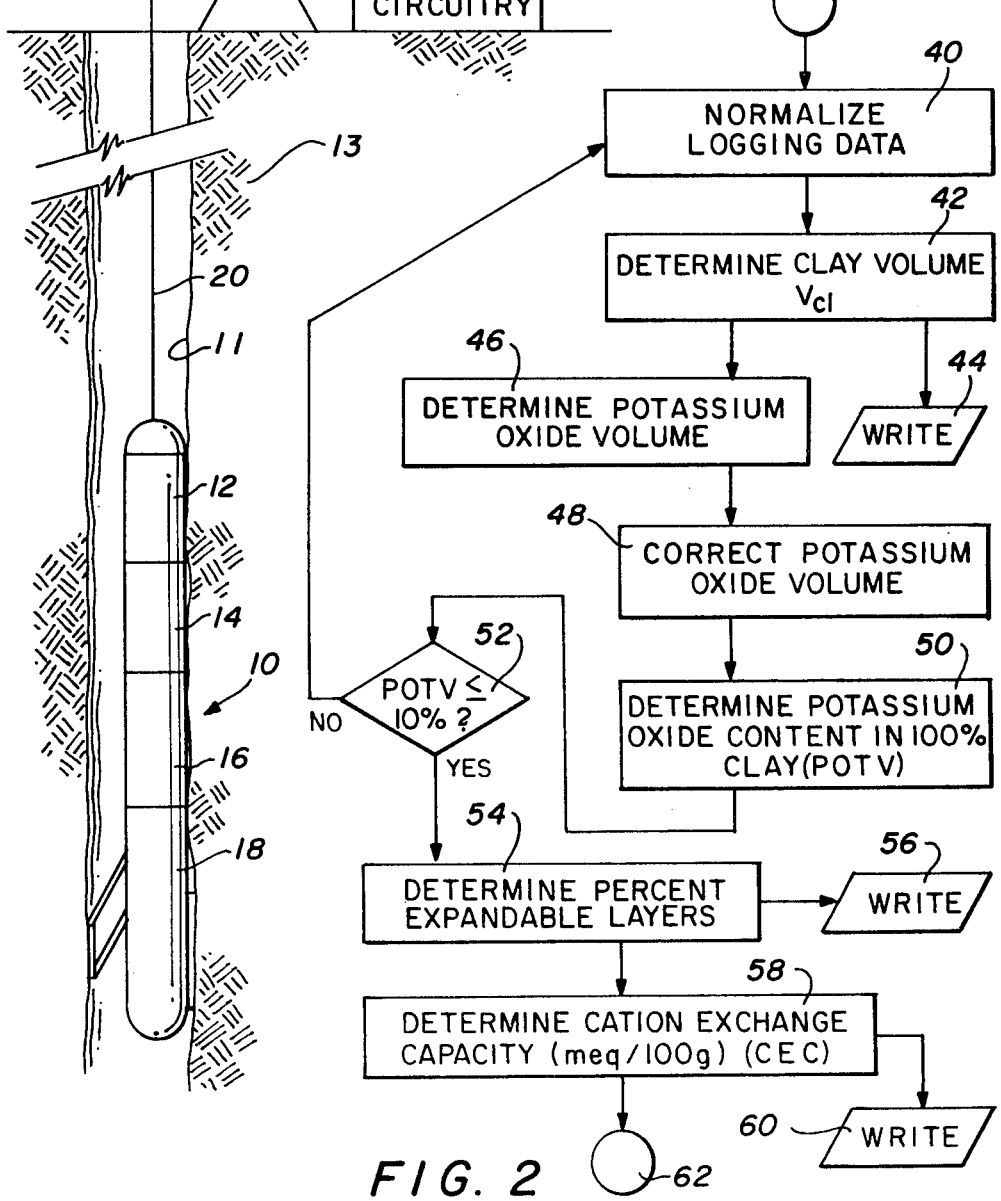
FIG. 2 illustrates a logic flow diagram exhibiting the method for determining characteristics of clay-bearing formations of the present invention.

Referring now also to FIG. 2 of the drawings, therein is illustrated in block diagram from a method of evaluating characteristics of clay-bearing formations in accordance with the present invention. It will be appreciated that these steps are preferably performed generally continuously, over a plurality of selected depth increments, on the basis of the data obtained from logging devices 12, 14, 16, and 18 so as to evaluate the desired formation parameters throughout the vertical extent of the formations of interest. For purposes of illustration, the present invention will be discussed in context of determining parameters of shaly sand reservoirs, typically considered to be those reservoirs composed of formations containing a sand matrix and further containing greater than approximately 5% clay.

In practicing the present invention input signals at input 38 of FIG. 2 preferable include measurements of the potassium content of the formations, measurements of the thorium content of the formations and a total gamma ray counts, all as derived by gamma ray device 14, plus a caliper measurement of the borehole, if available. These input signals are normalized 40. The normalization process consists of two corrections; a multiplicative correction of the potassium measurement and an additive correction of the potassium curve. The multiplicative correction is applied when the data needs to be either expanded or contracted to better fit the downhole gamma ray device 14 response to a known lithology. The additive correction is applied to correct a measurement which is consistently too high or too low.

The volume of clay within the reservoir formations is next determined 42. As stated earlier herein, clay types and distributions may change continuously throughout the extent of a reservoir and may affect different reservoir properties differently. Natural gamma ray spectral data will preferably be used to determine the volume of clay contained within the reservoir formations. Clays contain significant amounts of potassium, uranium, and thorium and therefore exhibit a natural radioactivity. Shaly sand formations also, however, may contain non-clay mineral components, such as silt, exhibiting significant radioactivity due to uranium concentrations therein. Techniques of natural gamma ray spectral logging such as that discussed and referenced earlier herein have the capability of determining the individual quantitative contributions of potassium, uranium, and thorium to the natural formation radioactivity, thereby facilitating the exclusion of the uranium contribution and further facilitating a measurement of formation radioactivity essentially independent of the silt content of the formation.

The determination of clay volume 42 is determined from the relationship:

$$Vcl = (S_{log} - S_{Mn})/(S_{Mx} - S_{Mn}) \qquad (1)$$

where $S_{log}$ represents the measurement at a given depth horizon, Mx represents the maximum measurement value in zones with 100% clay and Mn represents the minimum measurement value in clean sand intervals. The determination of clay volume can be based on a total counts measurement, the potassium-thorium product index or from a combination of both. The total gamma ray counts measurement is suitable when the formation is essentially free of silt. When this is not the case, it is preferable to use the potassium-thorium product index. This index reduces the influence of radioactive silt having high uranium concentration and is virtually independent of clay types.

Figure 3:
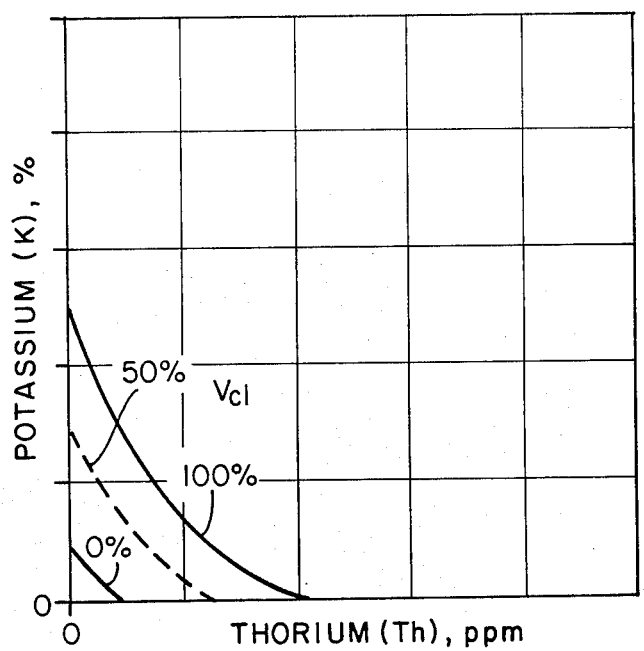
FIG. 3 illustrates a crossplot of potassium and thorium content within clay-bearing formations.

Referring to FIG. 3, therein is illustrated a crossplot of potassium and thorium content within clay-bearing formations. It has been found that while potassium and thorium contents vary for different types of clays, the potassium and thorium concentrations in clay-bearing formations tend to form a hyperbolic pattern in a potassium-thorium content crossplot, the distance of the hyperbola from the origin crossplot being indicative of the volume of clay within a formation. A potassium-thorium product index may be calculated on the basis of this crossplot in accordance with the relation:

$$PI = (K + a)(Th + b) \qquad (2)$$

where K represents the measured potassium contribution at a given depth horizon within the borehole, Th represents the measured thorium contribution at such depth horizon, and a and b represent zero offset constants calculated from the crossplot. In the preferred embodiment a is 3.1 and b is 12.4. The determined clay volume is outputted 44 for storage or presentation by plotter 36 as illustrated in the left column of the log presentation illustrated in FIG. 4.

The next step in the process of the present invention is to determine the potassium oxide volume 46 of the formation. The potassium oxide volume is determined in accordance with the relation:

$$KOX = K \times 1.2 \quad (3)$$

The potassium oxide volume value is corrected 48 for borehole size and casing by use of the caliper measurement, if available, and the casing diameter in accordance with the borehole and casing correction relationships for potassium. Such correction is expressed by the relation:

$$KOXc = KOX/RS \quad (4)$$

where:

$$RS = 10^{(2.103403 - .0286474 \cdot BH)} \quad (5)$$

for an open-hole with no casing;
$$RS = 10^{(2.061389 - .0332843 \cdot BH)} \quad (6)$$

for a borehole having 4.5" diameter casing;
$$RS = 10^{(2.062381 - .0376027 \cdot BH)} \quad (7)$$

for a borehole having 5.5" diameter casing;

$$RS = 10^{(2.074104 - .0417267 \cdot BH)} \quad (8)$$

for a borehole having 7.0" diameter casing and greater; and BH is the borehole size in inches, as can be derived from a caliper if available or available drilling data. These corrections are derived from test pit data in fluid filled boreholes.

The corrected potassium oxide volume is utilized along with the clay volume to determine the potassium oxide content in 100% clay 50 according to the relation:

$$POTV = KOXc/Vcl \quad (9)$$

The potassium oxide value in 100% clay determination should not exceed 10% 52. Even if the maximum potassium content measurement is slightly less than 10%, potassium oxide content is 1.2 times greater and in addition the correction for borehole size and casing could bring the value far above 10%. A measurement exceeding this limit could be due to calibration problems or the presence of mica and feldspars. In both cases a negative additive correction is appropriate 40.

The determination of the potassium oxide content in 100% clay is used to determine the percent of expandable layers 54 of the formation. This relationship is based on the negative correlation between percent of expandable layers and potassium oxide content in such clays as illites, glauconites, snectites and mixed-layer clay minerals. The percent of expandable layers is determined in accordance with the relation:

$$PCEL = 0.9 \times POTV^2 - 18.5 \times POTV + 100 \quad (10)$$

Figure 4:
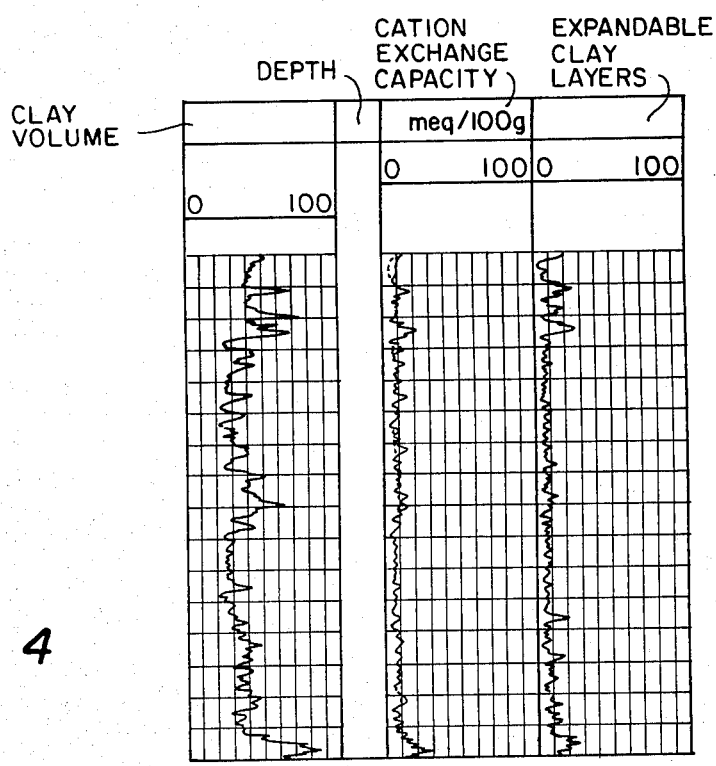
FIG. 4 illustrates a graphic presentation of the characteristics of earth formations as provided by the method of FIG. 2.

The percent expandable layers is outputted 56 for storage or presentation by plotter 36 as illustrated by the right track in the log presentation of FIG. 4, as a direct indicator of potential clay swelling and thus of the propensity of formation damage during completion or workover operations.

As previously stated the cation exchange capacity of the formation represents the amount of cations on the clay surface which may be easily exchanged for other cations in the environment of an aqueous solution. The prior art has typically relied at least partially upon core data to determine formation cation exchange capacity. The present invention contemplates determination of formation cation exchange capacity 58 based on natural gamma ray data without core data. This determination is based on the direct proportionality of the cation exchange capacity to the percent expandable layers determination and is expressed in accordance to the relation:

$$CEC = (8.2 + 0.54 \times PCEL) \times Vcl \quad (11)$$

providing a value of cation exchange capacity in meq/100 g. The cation exchange capacity determination is outputted 60 for storage or presentation by plotter 36 as illustrated in the center track of log presentation of FIG. 4. Further, the cation exchange capacity determination exists at 62 for use in combination within porosity and gain matrix density data for determining the concentration of counter ions (Qv) in the formation water in contact with the clay which is useful in determining water saturation by methods familiar in the art. A more detailed description of these determinations can be found in my copending patent application Ser. No. 416,826 which is incorporated herein by reference.

Many modifications and variations besides those specifically mentioned herein may be made in the techniques and structures described herein and depicted in the accompanying drawings without departing substantially from the concept of the present invention. For example, many relations are known to the art for determining formation porosity and may be utilized in accordance with the present invention. Similarly, a variety of relations are known for determining permeability and may be used to determine permeability data in response to water saturation and for porosity data and may be utilized in accordance with the present invention. Additionally, supplemental core data may be used to further evaluate or interpret parameters in accordance with techniques such as those described herein. Accordingly, it should be clearly understood that the forms of the invention described and illustrated herein are exemplary only, and are not intended as limitations on the scope of the present invention.

The embodiments of the invention in which an exclusive property or privilege is claimed are defined as follows:

1. A method of determining characteristics of earth formations, comprising the steps of:
   determining the volume of clay contained in said earth formations;
   determining a first property of said formations functionally related to said volume of clay; and
   determining a second property of said formations in response to said first property, said second property indicating potential clay swelling.

2. The method according to claim 1 wherein the step of determining the volume of clay comprises the steps of:
   deriving natural gamma ray spectral data from said formations; and
   determining said volume of clay in response to said natural gamma ray spectral data.

3. The method according to claim 1 wherein the step of determining a first property comprises the steps of:
   determining the volume of potassium oxide of said earth formations; and determining in response to said volume of potassium oxide an estimated volume of potassium oxide in an environment composed essentially entirely of clay.

4. The method according to claim 3 further comprising the step of correcting said volume of potassium oxide for casing and hole size.

5. A method of determining characteristics of earth formations, comprising the steps of:
determining the volume of clay contained in said earth formations;
determining a first property of said formations functionally related to said volume of clay; and
determining a second property of said formations functionally related to said first property, said second property indicating potential clay swelling wherein the step of determining a second property comprises the step of determining the percent of expandable clay layers present in said formations.

6. A method of determining characteristics of earth formations, comprising the steps of
determining the volume of clay contained in said earth formations;
determining a first property of said formations functionally related to said volume of clay;
determining a second property of said formations functionally related to said first property, said second property indicating potential clay swelling; and
determining a third property functionally related to said second property and said volume of clay, said third property indicating the cation exchange capacity of said formations.

7. The method according to claim 5 further comprising the step of determining the cation exchange capacity unit per pore volume (Qv) of said formations in functional relation to said third property.

8. The method according to claim 7 further comprising the step of determining the water saturation of said formations in response to said Qv of said formations.

9. A method of determining characteristics of clay-bearing earth formations, comprising the steps of:
generating electrical signals functionally related to the energy and frequency of detected radiations;
determining in response to at least a portion of said electrical signals the volume of clay content of said formations;
determining in response to at least a portion of said electrical signals a first property of said formations;
determining in response to said first property a second property of said formations, said second property indicating the percent of expandable clay layers of said formations; and
determining the cation exchange capacity of said formations, said determination functionally related to said volume of clay and said percent of clay layers.

10. The method of claim 9 wherein the step of generating electrical signals comprises the steps of:
detecting natural gamma radiations emanating from said formations; and
generating electrical signals functionally related potassium, thorium and total gamma ray counts of said detected radiations.

11. The method of claim 10 wherein the step of determining the volume of clay comprises the steps of:
determining a potassium-thorium product index; and
determining said volume of clay in response to said index.

12. The method of claim 10 wherein the step of determining the volume of clay comprises the step of determining the volume of clay in response to the total gamma ray counts.

13. The method of claim 10 wherein the step of determining the volume of clay comprises the steps of:
determining a potassium-thorium product index; and
determining said volume of clay in response to a combination of said index and said total gamma ray counts.

14. The method of claim 10 wherein the step of determining a first property includes the step of determining the volume of potassium oxide of said formations.

15. The method of claim 14 wherein the step of determining the volume of potassium oxide includes the step of determining said volume of potassium oxide in an environment composed essentially entirely of clay, said environment having a composition functionally equivalent of said volume of clay of said formations.

16. The method according to claim 14 further comprising the step of correcting said volume of potassium oxide for casing and hole size.

17. A method of well logging, comprising the steps of:
traversing a borehole with a natural gamma ray spectral logging instrument;
detecting natural gamma radiation occurring in the formations surrounding said borehole;
generating electrical signals functionally related to the energy and frequency of said detected radiation corresponding to potassium, thorium and total gamma ray counts;
determining the volume of clay within said formations in response to at least a portion of said electrical signals;
determining the volume of potassium oxide content of said formations in response to said electrical signal corresponding to potassium;
correcting said volume of potassium oxide for casing and hole size;
determining in response to said corrected volume of potassium oxide the potassium oxide content for an environment composed essentially entirely of clay having a composition functionally equivalent to said volume of clay of said formations;
determining the percent of expandable clay layers within said formation in response to said potassium oxide content; and
determining the cation exchange capacity in response to said percent of expandable layers and said volume of clay.

18. The method of claim 17 further comprising the step of determining the cation exchange capacity unit per pore volume (Qv) of said formations in response to said cation exchange capacity.

19. The method of claim 18 further comprising the step of determining the water saturation of said formations in response to said Qv of said formations.

20. The method of claim 17 further comprising the step of normalizing said electrical signal corresponding to potassium in response to said potassium oxide content.

* * * * *